Dec. 12, 1944.  R. L. LEVY  2,365,091
HYDRAULIC CONTROL SYSTEM
Filed Nov. 28, 1941
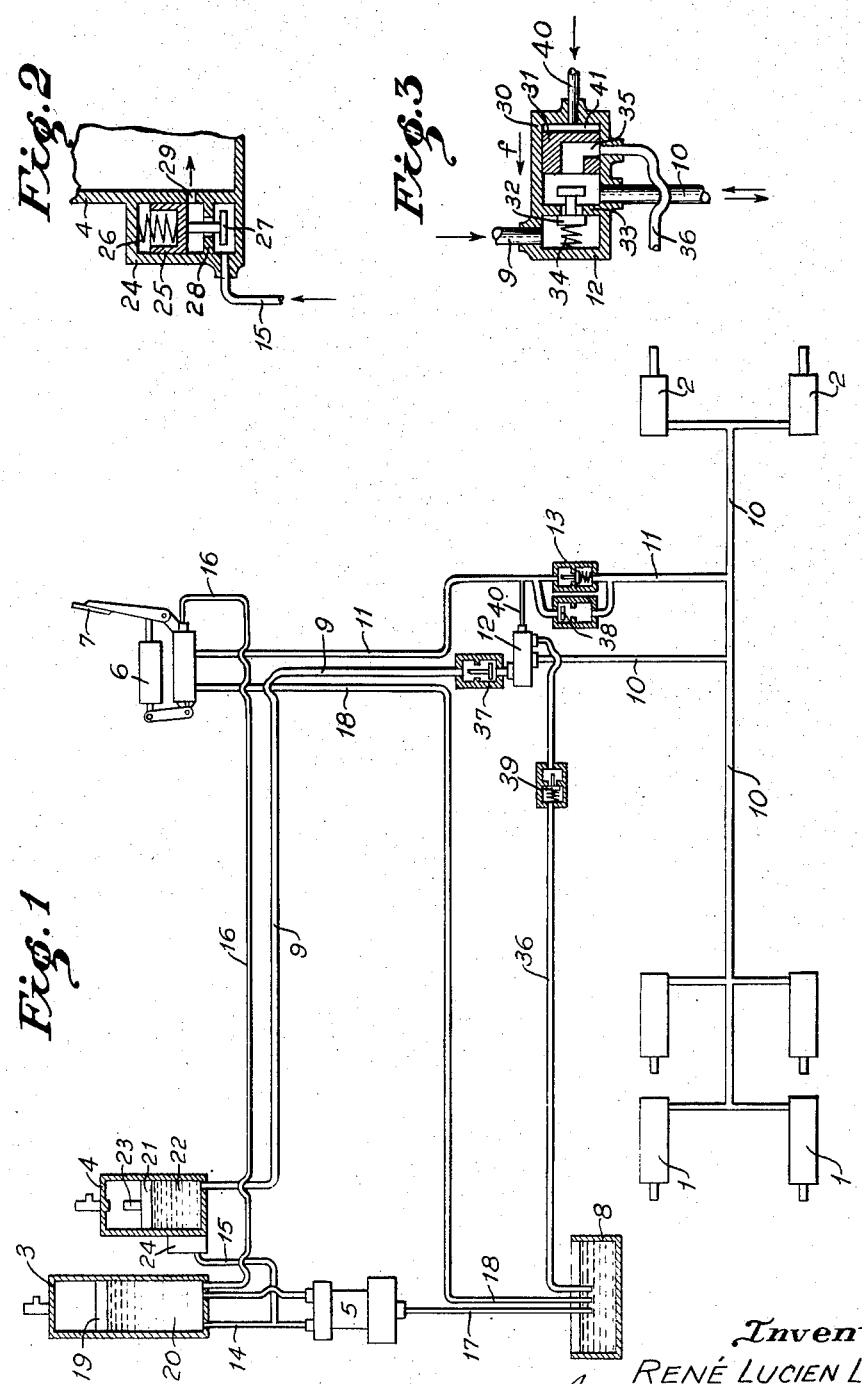
Inventor:
RENÉ LUCIEN LEVY Patented Dec. 12, 1944

2,365,091

UNITED STATES PATENT OFFICE 2,365,091

HYDRAULIC CONTROL SYSTEM

René Lucien Levy, Paris, France, assignor to Societe d'Inventions Aeronautiques et Mecaniques S. I. A. M., Fribourg, Switzerland Application November 28, 1941, Serial No. 420,875
In France September 20, 1940

5 Claims. (Cl. 60—51)

Various devices are already known for admitting a liquid into a working circuit, under a pressure proportional to the force exerted upon a control member, for instance with the object of controlling vehicle brakes.

These devices comprise essentially a hydropneumatic accumulator containing a liquid under high pressure, and an apparatus which may be termed a "liquid operated pressure releasing apparatus" and permits a progressive transfer of the pressure reigning inside the accumulator, towards the working circuit, for instance the brake cylinders.

The braking action, as likewise a number of hydraulic actions in other fields, comprises two distinct steps, viz.: firstly the movement of the brake blocks towards the brake drum, with a corresponding movement of the liquid but no appreciable motive force, and secondly the exertion of the braking force, with a corresponding practically zero displacement of liquid but progressive transmission of energy effecting the braking.

The devices of the said liquid operated pressure releasing type are particularly apt for exerting a progressive pressure in a work piping, but will not give entire satisfaction for rapid filling of such a piping.

Their application in brake mechanisms or any other similar hydraulic applications therefore give rise to two main drawbacks, the first of which is a certain lag in the transmission of the braking action, and the other an untimed production of water-hammering due to the fact that the pipings are forced to fill with very high pressure liquid.

The object of the present invention is to avoid these drawbacks and the invention consists mainly in using, for effecting the braking or similar actions, two hydro-pneumatic accumulators, one of which, operated under low pressure, causes the rapid filling of the brake or other circuits by means of large cross-section pipes and ceases to act as soon as the filling is effected, while the progressively increasing force necessary for tightening the brakes is then set up by the second accumulator, operating under high pressure.

According to another characteristic of the invention, the switching over from one accumulator to the other may be effected by the combination of a calibrated valve with a relay arranged on the large cross-section pipe, between the low pressure accumulator and the members to be controlled, said valve remaining closed—and thus setting up the action of the relay—when the pressure ahead of the valve is less than a predetermined value, while, when the pressure exceeds said value, the valve will open and set up communication between the work circuit and the high pressure accumulator.

The system is controlled by acting upon a distributor connected to the high pressure accumulator, to the tank and to the circuit feeding the valve. The distributor may be of a type known per se.

Another advantageous characteristic of the invention is that a sole, high pressure, pump is used for filling both accumulators. In the low pressure accumulator, the limitation of the pressure to the required value, of the order of for instance 70 lbs. sq. in., is obtained by two distinct means: firstly by a stop limiting the stroke of the piston inside the cylinder of this accumulator when the pressure of the air above said piston has attained the chosen value, and secondly by the presence of a hydraulic pressure release device, which, for the same value of the pressure, disconnects the low pressure accumulator from the pump and causes the latter to discharge into the high pressure accumulator.

A hydraulic control system according to these various characteristics and comprising, besides, a number of auxiliary devices, is shown diagrammatically on the annexed drawing, in which:

Figure 1 shows the entire system applied to the control of vehicle brakes, and

Figures 2 and 3 show respectively, in section, the hydraulic pressure release device and the relay.

The system comprises, for the control of the group of brake cylinders 1, 2, two accumulators: a high pressure accumulator 3 and a low pressure accumulator 4, a pump 5, a distributor 6 actuated by a pedal 7, a lever or the like, a tank 8, a large cross-section pipe 9 connecting the low pressure accumulator to the work circuit 10 which, in this instance, supplies the brake cylinders 1 and 2, a hydraulic relay 12, a calibrated valve 13 mounted in a piping 11 of a smaller cross-section than piping 9 and coming from distributor 6, a pipe 14, 15 connecting the pump 5 to the accumulators, a pipe 16 connecting the high pressure accumulator to the distributor 6, two pipes 17 and 18 respectively connecting pump 5 and distributor 6 to the tank 8.

The high pressure accumulator 3 is of the known type comprising a piston 19 covering a column of liquid 20.

In the low pressure accumulator 4, the piston 21, acting upon the column of liquid 22, comprises a stop 23 limiting its stroke.

The communication of this low pressure accumulator with the pump 5 is set up through the means of a hydraulic pressure release device 24 (Figure 2) comprising, inside a liquid-tight chamber, a piston 25 subjected to the action of a spring 26 tending constantly to move a valve 27 away from its seat 28. This pressure release device communicates with the pump and the accumulator, respectively through the pipe 15 and aperture 29.

The hydraulic relay (Figure 3) comprises, inside a cylinder 30, a piston 31, the movement of which in the direction of arrow f causes the backward movement of a double valve 32 movable with respect to a seat 33 and subjected to the action of a spring 34. The piston 31 itself serves as a seat for said valve and is provided with a channel 35 communicating, through a conduit 36, with the tank 8, while two other apertures, provided in the cylinder 30 of said relay, connect the latter on one hand with the low pressure accumulator, through pipe 9, and on the other hand with the work circuit.

Three valves 37, 38, 39, the function of which will be defined below, are mounted: the first on pipe 9 before the hydraulic relay 12, the second as a by-pass to the calibrated valve 13, and the third on the return pipe 36 to the tank.

The operation of the system is as follows:

Assuming, for fixing ideas, that the pressures in the high pressure and the low pressure accumulators are respectively 1400 and 70 lbs./sq. in., when the operator, for instance the driver, actuates the pedal 7 of distributor 6, he will set up communication between pipes 11 and 16 and at the same time disconnect the distributor from the tank 8. Such distributors, adapted for connecting a control circuit (here pipe 11) alternately with a pipe under pressure (16) or with an escape pipe (18), are already known, as particularly from the French Patent 776,289, of October 12, 1933, to the same applicant.

Valve 13 is calibrated in a manner to remain closed as long as the pressure on the accumulator side of it in pipe 11, does not exceed say 55 lbs./sq. in.

Under these conditions, during the first fraction of the distributor operation, the valve will remain closed, so that the pressure will produce, over pipe 40 and aperture 41 of the relay, the motion of piston 31 of the latter. This movement will in turn firstly disconnect the relay from the tank and secondly connect pipe 9 to the work circuit 10.

This connection is, moreover, effected suddenly, by the unseating of valve 32 which thereby compresses its spring 34. Pipes 9 and 10 being of large cross-section, the operation of the relay sets up a rapid filling of these pipes and, therefore, the immediate application of the brake blocks in cylinders 1 and 2. Due to the rise of pressure in pipe 11 under the effect of continued action exerted upon the distributor pedal, valve 13 will open, when this pressure on the accumulator side of the valve exceeds 55 lbs./sq. in., and set up the tightening of the brake blocks under a pressure which may be of the order of 130 lbs. for instance.

When the distributor is released, the rapid return of the brake blocks to the nonoperative position is made possible by valve 38 permitting the free flow of the liquid from the brakes to the distributor.

When the pressure in pipe 11, at the accumulator side of the calibrated valve 13, falls below the amount required for actuating relay 12, the spring 34 of said relay becomes operative, thus abolishing the connection between the relay and the low pressure accumulator 4, while pipe 10 is being connected to tank 8 through pipe 36, thus permitting the emptying of pipes 10.

In case the level of relay 12 is insufficient for maintaining the pipes filled with liquid, it will be good to arrange on pipe 36 a check-valve 39 adapted to maintain a certain overpressure in the pipes.

The valve 37 has the object of checking any return of liquid towards the low pressure accumulator when the pressure provided by distributor 6 exceeds the calibration value of valve 13.

The filling of the accumulators is effected as follows:

The high pressure pump 5 first delivers into the low pressure accumulator 4. When the latter is charged, i. e., when the stop 23 of piston 21 has struck against the bottom of the cylinder, the pump will deliver into the high pressure accumulator and piston 19 of the latter will rise up to such a level that the pressure of the air above said piston attains for instance 1400 lbs./sq. in.

This pressure is termed the "uncoupling pressure," since the pump 5 is designed to stop automatically its operation when this pressure is attained, and to start up again automatically when the pressure in the high pressure accumulator has dropped to say 1100 lbs./sq. in.

The hydraulic pressure release device 24, the object of which is, together with the stop 23, to limit to the required value the pressure inside the low pressure accumulator 4, further provides operative connection between both accumulators. Thus, if the low pressure accumulator 4 should empty without the high pressure accumulator 5 having reached the pressure for restarting the pump, the hydraulic pressure release device 24 will set up a connection between the accumulators, permitting the low pressure accumulator to fill with liquid drawn from the high pressure accumulator. As this results in a rapid drop of pressure in the latter, the pump will be started up automatically.

What I claim is:

1. A hydraulic control system, particularly for vehicle brakes or other applications, comprising: a work circuit, a low pressure hydropneumatic accumulator, a first pipe of comparatively large cross-section connecting said accumulator to said work circuit, a tank, a relay interposed in said pipe, a movable member arranged in said relay and the movement of which has the effect of disconnecting the work circuit from the tank and connecting the low pressure accumulator with the work circuit and conversely, a hydropneumatic high pressure accumulator, a second pipe of comparatively small cross-section connecting the high pressure accumulator and the work circuit, a calibrated valve interposed in the second pipe and opening only when in the latter the pressure on the accumulator side of the valve attains a predetermined value, a third pipe connecting said relay and the second pipe, on the accumulator side of the calibrated valve, and permitting the pressure reigning in the second pipe to act upon the movable member of the relay, a distributor in said second pipe capable of connecting the calibrated valve alternately with the high pressure accumulator or with the tank, and a check-valve mounted on the first pipe, between the relay and the low pressure accumulator.

2. A hydraulic control system, particularly for vehicle brakes or other applications, comprising: a work circuit, a low pressure hydropneumatic accumulator, a first pipe of comparatively large cross-section connecting said accumulator to said work circuit, a tank, a relay interposed in said pipe, a movable member arranged in said relay and the movement of which has the effect of disconnecting the work circuit from the tank and connecting the low pressure accumulator with the work circuit and conversely, a hydropneumatic high pressure accumulator, a second pipe of comparatively small cross-section connecting the high pressure accumulator and the work circuit, a calibrated valve mounted on this second pipe and opening only when in the latter the pressure on the accumulator side of the valve attains a predetermined value, a third pipe connecting said relay and the second pipe, on the accumulator side of the calibrated valve, and permitting the pressure reigning in the second pipe to act upon the movable member of the relay, a distributor in said second pipe capable of connecting the calibrated valve alternately with the high pressure accumulator or with the tank, a valve interposed in the second pipe, in parallel with the calibrated valve, and permitting the unidirectional flow of liquid from the work circuit towards the distributor and a check valve mounted on the first pipe between the relay and the low pressure accumulator for preventing return of liquid to the low pressure accumulator when the pressure provided exceeds the value of the calibrated valve.

3. A hydraulic control system, particularly for vehicle brakes or other applications, comprising: a work circuit, a low pressure hydropneumatic accumulator, a first pipe of comparatively large cross-section connecting said accumulator to said work circuit, a tank, a relay interposed in said pipe, a movable member arranged in said relay and the movement of which has the effect of disconnecting the work circuit from the tank and connecting the low pressure accumulator with the work circuit and conversely, a hydropneumatic high pressure accumulator, a second pipe of comparatively small cross-section connecting the high pressure accumulator and the work circuit, a calibrated valve interposed in the second pipe and opening only when in the latter the pressure on the accumulator side of the valve attains a predetermined value, a third pipe connecting said relay and the second piping, on the accumulator side of the calibrated valve, and permitting the pressure reigning in the second pipe to act upon the movable member of the relay, a distributor in said second pipe capable of connecting the calibrated valve alternately with the high pressure accumulator or with the tank, a check-valve arranged between said relay and the tank for maintaining constantly a slight overpressure in the pipes and another check valve mounted on the first pipe between the relay and the low pressure accumulator.

4. A hydraulic control system, particularly for vehicle brakes or other applications, comprising: a work circuit, a low pressure hydropneumatic accumulator, a first pipe of comparatively large cross-section connecting said accumulator to said work circuit, a tank, a relay interposed in said pipe, a movable member arranged in said relay and the movement of which has the effect of disconnecting the work circuit from the tank and connecting the low pressure accumulator with the work circuit and conversely, a hydropneumatic high pressure accumulator, a second pipe of comparatively small cross-section connecting the high pressure accumulator and the work circuit, a calibrated valve interposed in the second pipe and opening only when in the latter the pressure on the accumulator side of the valve attains a predetermined value, a third pipe connecting said relay and the second pipe on the accumulator side of the calibrated valve, and permitting the pressure reigning in the second pipe to act upon the movable member of the relay, a distributor in said second pipe capable of connecting the calibrated valve alternately with the high pressure accumulator or with the tank, a check-valve interposed on the first pipe, between the relay and the low pressure accumulator, a valve interposed in the second pipe, in parallel with the calibrated valve, and permitting the unidirectional flow of liquid from the work circuit towards the distributor, a check-valve arranged between said relay and the tank for maintaining constantly a slight overpressure in the pipes and another check valve mounted on the first pipe between the relay and the low pressure accumulator to isolate the low pressure accumulator from the circuit when the high pressure accumulator is active.

5. A hydraulic control system, particularly for vehicle brakes or the like, comprising a work circuit, a low pressure hydro-pneumatic accumulator, a first passageway of comparatively large cross-section connecting said accumulator to the work circuit for effecting rapid filling of said circuit, said accumulator ceasing to operate as soon as the filling is completed, a high pressure hydropneumatic accumulator, a second passageway of comparatively small cross-section connecting the high pressure accumulator to the work circuit, a relay interposed in the first passageway, a loaded valve interposed in the second passageway and adapted to open only when the pressure in the second passageway on the accumulator side of the valve attains a predetermined value, a third passageway connecting the relay to the second passageway at a point between said valve and the high pressure accumulator, a tank, a fourth passageway connecting the relay to the tank, a distributor interposed in the second passageway, a fifth passageway connecting the distributor to said tank, said distributor being adapted to control the flow of liquid from the high pressure accumulator to said loaded valve or from the second passageway to the tank on the accumulator side of the loaded valve, said relay including movable means responsive to pressure in the second passageway at the accumulator side of the loaded valve for controlling the passage of liquid through the first passageway to the work circuit or from the work circuit through the fourth passageway to the tank.

RENÉ LUCIEN LEVY.